3,293,026
TIN PURIFICATION PROCESS
Frank A. Forward, Ottawa, Ontario, and Andrew I. Vizsolyi, Vancouver, British Columbia, Canada, assignors to Sherritt Gordon Mines Limited, Toronto, Ontario, Canada, a company of Canada
No Drawing. Filed Aug. 24, 1964, Ser. No. 391,752
9 Claims. (Cl. 75—101)

This invention relates to a hydrometallurgical method for purifying tin metal containing undesirable impurities such as lead, copper, zinc and other metal impurities commonly associated with tin ores in small but contaminating amounts. The invention also provides a method for the recovery of substantially pure tin from cassiterite containing lead and other undesirable impurities.

It is well known to produce tin metal from cassiterite ($SnO_2$) by reduction with carbon at elevated temperatures, the purity of the product depending, to a major degree, on the amount and kind of impurities associated with the cassiterite subjected to the reduction treatment. A certain amount of purification of the reduced tin can be effected by liquation and boiling, tossing, or poling, but the production of tin with a purity of 99.95 or better from starting materials containing appreciable amounts (0.5% or more) of elements such as lead, copper, zinc, antimony, tungsten, molybdenum and arsenic, requires introduction of a further chemical refining procedure such as electrolysis. However, various economic and technical considerations have prevented the adoption of electrolytic tin refining processes on any appreciable commercial scale, and generally high purity tin is produced on a commercial basis only from tin ores which contain such small amounts of associated metal impurities that application of the conventional pyrometallurgical methods results in tin of high purity.

It has been proposed to produce high purity tin from impure cassiterite by reducing the cassiterite with hydrogen to produce impure tin metal, dissolving the metal in a sulphuric acid solution containing chlorides and then electrolyzing the leach solution to produce metallic tin. This process also was never commercially successful because of the difficulty encountered in removing lead to a suitable degree from the chloride solution and the further problem of maintaining the electrolyte with suitable additives which would permit operating the electrolysis without excessive "treeing" of the cathode tin.

The present invention provides a method for purifying tin which is not subject to these prior art difficulties. In its broadest aspects, the invention is based on the discovery that tin metal can be fully dissolved in sulphuric acid solution by agitating under an oxygen overpressure at a low temperature in the range of about 10° C. to about 30° C., to produce a solution containing Sn (IV) sulphate and Sn (II) sulphate. Further, it has been found that although Sn (II) sulphate normally does not hydrolyze readily, by heating the leach solutions to about 90° C. to 110° C. under low oxygen pressure, the dissolved tin can be substantially completely hydrolyzed and precipitated as high purity $SnO_2$. Sulphuric acid is regenerated in the solution and, after separation of the tin precipitate, it can be re-used for dissolving more tin.

The present invention utilizes these discoveries to provide a method for the purification of tin metal containing undesirable impurities such as lead in appreciable but not excessive amounts. The invention also provides a method for producing high purity tin from cassiterite containing undesirable associated metal impurities, such as lead, in appreciable but not excessive amounts; and, for the purposes of explanation, it will be discussed in more detail hereinafter by reference to such a process. However, it is to be understood that the invention is not limited to this application but may also be utilized, for example in the recovery of high purity tin from impure tin scrap or in the production of finely divided granular $SnO_2$ of high purity.

The treatment of impure cassiterite for the recovery of high purity tin in accordance with the present invention comprises the following steps: reduction of cassiterite with hydrogen or carbon reductants to form impure metallic tin either in powder or molten form; dissolution of the impure tin at a temperature in the range of about 10° C. to about 30° C., preferably at room temperature, with sulphuric acid under an overpressure of oxygen to produce a solution containing dissolved $SnSO_4$ and $Sn(SO_4)_2$; hydrolyzing the tin sulphate under a positive pressure of oxygen at 50° C. to 110° C. to precipitate a substantially pure oxidized tin compound and regenerate $H_2SO_4$; separating the precipitated tin compound from the barren solution; and reducing the high purity tin compound with hydrogen or carbon reductants to produce tin metal of 99.9% purity.

In carrying out the process, the cassiterite concentrate is preferably ground to a particle size below about 150 microns. The ground material is reduced with hydrogen or carbon according to conventional procedures to produce crude tin. The reduction can be carried out at temperatures below 650° C. to produce crude tin in powder form or at temperatures of 650° to 750° C. to produce molten tin which, preferably, is atomized before leaching.

The reduced concentrate is then leached in aqueous sulphuric acid solution under a positive oxygen overpressure at a temperature below about 30° C. In order for the dissolution to proceed, it is necessary to provide at least 3 moles of acid per mole of tin. There is no particular advantage in employing acid in excess of this amount. In fact, the tin dissolution rate under optimum conditions of temperature and oxygen overpressure is substantially the same for 3.0 moles of acid and 5.0 moles of acid per mole of tin.

It has been found that tin dissolution will proceed with a deficiency of sulphuric acid, i.e. with less than 3.0 moles of acid per mole of tin, as long as the $SO_4^=$ content of the leach solution is equivalent to at least 3 moles $SO_4^=$ per mole of tin and providing that at least 2 moles of free acid per mole of tin are present. Thus, if desired, the sulphuric acid requirements can be partly substituted by other acids and neutral or acidic sulphates. At $SO_4^=$ concentrations below 3 moles per mole of tin, the Sn (IV) sulphate tends to hydrolyze even at 20° C. and the rate of dissolution, although high initially, is soon reduced to zero. In fact, at a $SO_4^=$/tin ratio of 2.3:1, there is appreciable reprecipitation of tin from solution at 20° C. However, increasing the $SO_4^=$ addition above 3.0 moles per mole of tin does not appreciably increase the tin dissolution rate.

The exact oxygen overpressure is not a critical factor. A 5 to 10 p.s.i. oxygen overpressure is adequate and, although higher pressures may be employed, they do not substantially increase the rate of dissolution of the tin.

The temperature at which the tin dissolution is carried out is very important. The following table shows the effect of temperature on the dissolution of tin metal in dilute sulphuric acid solutions under an oxygen overpressure:

TABLE I

*Effect of temperature on tin oxidation in sulphuric acid solution*

Conditions: Temperature, 90° C., 50° C., 20° C. and 10° C., $O_2$ overpressure, 30 p.s.i.
Charges: 120 gm. Sn powder, 150 ml. $H_2SO_4$, 2850 ml. $H_2O$.

| Temperature, ° C. | Retention time (hrs.) | Sn (g.p.l.) in solution | Sn percent extracted |
|---|---|---|---|
| 90 | ½ | 3.0 | 7.5 |
|    | 1  | 1.7 | 4.2 |
|    | 2  | 6.8 | 2.0 |
|    | 4  | 0.4 | 1.0 |
|    | 5  | 0.2 | 0.5 |
| 50 | ½ | 19.1 | 47.5 |
|    | 1  | 16.1 | 40.3 |
|    | 2  | 12.8 | 32.0 |
|    | 4  | 10.1 | 25.2 |
|    | 5  | 9.1  | 23.6 |
| 20 | ½ | 14.1 | 35.3 |
|    | 1  | 22.8 | 57.2 |
|    | 2  | 26.1 | 65.2 |
|    | 4½ | 31.5 | 79.0 |
|    | 6  | 37.0 | 93.0 |
| 10 [1] | ½ | 11.4 | 28.6 |
|    | 1  | 33.3 | 83.0 |
|    | 2  | 36.0 | 90.0 |
|    | 4  | 37.5 | 94.6 |
|    | 6  | 38.6 | 96.5 |

[1] The oxygen overpressure for the 10° C. tests was 10 p.s.i.

As the temperature is increased above 20° C., tin extractions decrease because $Sn(SO_4)_2$ begins to hydrolyze forming, below 90° C., $Sn(OH_2)_4$ and above about 90° C., $SnO_2$ containing no water of hydration. Thus, in order to ensure dissolution of tin and to avoid re-precipitation of dissolved tin, it is essential to conduct the acid leach at a temperature below about 30° C. Preferably, leaching is conducted at normal room temperature where a small amount of cooling will generally be required, especially at the start of the leach when some heat is generated, to maintain the temperature within the required range. Temperatures lower than 20° C. are satisfactory as, for example, there is little appreciable difference in the rate of tin dissolution at 20° C. and 10° C., although there is little advantage in such lower temperatures if they involve increased cooling costs.

The tin dissolution rate is affected by the quantity of metallic impurities present. Where metal impurities are less than about 4 weight percent, under optimum leaching conditions substantially complete dissolution of the impure tin is effected in about 3 to 6 hours. For example, in the case of impure tin containing 1.5 weight percent Pb and 1.5 weight percent Fe, 100% dissolution of the tin can be obtained in 6 hours under optimum leaching conditions. In a test carried out with impure tin powder containing 6 weight percent Pb and 6 weight percent Fe, 68% extraction of the tin was obtained in 6 hours under optimum leaching conditions.

When conditions are such that leaching is effective, the ratio of Sn (IV) to Sn (II) in the resulting solution varies between 1.5/1 and 2.5/1. Once dissolution is complete, the ratio of Sn (IV) to Sn (II) changes very little and at temperatures below 30° C. only very slight oxidation of Sn (II) to Sn (IV) takes place even though oxygen (e.g. at 10 p.s.i.) is available.

After separation from the undissolved residue which contains 100% of the refractory oxides as well as substantially all the Pb, $WO_3$ and other impurities, the leach solution is heated to hydrolyze the dissolved tin and precipitate it from the solution substantially free from impurities. As the temperature is increased above about 30° C., the $Sn(SO_4)_2$ begins to hydrolyze forming at about 50° C. to about 60° C. $Sn(OH)_4$ and at about 90° C., $SnO_2$ containing no water of hydration. The dissolved $SnSO_4$ is stable at temperatures up to about 100° C., but at temperatures above about 90° C. and under an oxygen overpressure of about 5 to 10 p.s.i., $SnSO_4$ also hydrolyzes to $SnO_2$ and precipitates from the solution substantially free from impurities. Sulphuric acid is regenerated as the tin sulphate is hydrolyzed. Thus, under optimum hydrolysis conditions, i.e. a temperature above about 90° C. and 10 p.s.i. oxygen overpressure, pure $SnO_2$ is precipitated rapidly and efficiently from the solution with simultaneous regeneration of sulphuric acid. The precipitate is in the form of a finely divided, easily filterable crystalline solid. The barren solution containing regenerated sulphuric acid can be recycled to the tin leaching step. Soluble impurities can be removed from the circuit by "bleeding" a portion of the barren solution.

The pure $SnO_2$ may be used as such for example in ceramics, or can be reduced to tin metal by conventional procedures such as by reduction with hydrogen at about 570° C. Tin metal so obtained is of better than 99.9% purity.

The present invention is further illustrated by the following specific example:

The process was applied in the laboratory to the treatment of a cassiterite concentrate having the following composition:

| | Percent |
|---|---|
| $SnO_2$ | 93.54 |
| $TiO_2$ | 0.79 |
| $Fe_2O_3$ | 0.41 |
| Rare earth oxides | 0.44 |
| $SiO_2$ | 0.66 |
| $ZrO_2$ | 0.11 |
| $Ta_2O_5$ | 1.12 |
| $Cb_2O_5$ | 1.09 |
| $WO_3$ | 0.89 |
| $Al_2O_3$ | 0.33 |
| Pb | 0.55 |
| MnO | 0.15 |
| Bi | 0.002 |
| Cu | 0.001 |
| As | 0.0025 |
| Sb | <0.0001 |

The concentrate was ground to 100% minus 200 mesh and carefully reduced with $H_2$ in three stages at 750° C., 605° C. and 650° C. (with intermediate comminution steps) to produce impure tin in the form of fine powder. If the temperature exceeded 650° C. at any stage there was a tendency to produce large tin globules rather than powder. (The reduction could have been carried out in one stage at 650°–700° C. to produce impure tin metal which would be atomized before leaching.)

The reduced concentrate was leached in a laboratory autoclave at 20° C. and under 10 p.s.i. $O_2$ for 4 hours using a sulphuric acid solution containing 3.0 moles acid per mole of tin metal. Each leaching charge contained 600 gm. reduced cassiterite in a total volume of 3.6 litres of pulp.

The leach solutions resulting from a number of autoclave operations were combined to give a total volume of 32 litres analyzing 110 g./l. Sn (77 g./l. Sn (IV) plus 33 g./l. Sn (II)). This solution was divided in two parts which were treated separately. One portion was heated in an open vessel at 95° C. for 4 hours which effected the reduction of Sn in solution to 48 g./l. which represents 56.4% precipitation of Sn as $SnO_2$. Another portion was heated in an autoclave at 110° C. under 10 p.s.i. $O_2$ pressure for 4 hours reducing the Sn content to 4.0 g./l. representing approximately 96% precipitation of tin as $SnO_2$.

The $SnO_2$ precipitated at 110° C. was crystalline and filtered very easily.

The leach residue which represented 8.8% of the weight of the original cassiterite concentrate (0.46 kg. residue from 5.2 kg. concentrate) analyzed as follows:

| | Percent |
|---|---|
| Sn | 23.3 |
| $(Ta+Nb)_2O_5$ | 20.8 |
| $Fe_2O_3$ | 2.9 |
| Pb | 9.5 |
| $TiO_2$ | 5.0 |
| $SiO_2$ | 4.8 |
| $WO_3$ | 10.8 |
| $Al_2O_3$ | 10.7 |

This represents 97.2% recovery of Sn in the leach solutions with 100% of the refractory (Ta+Nb) oxides in the residue as well as substantially all the Pb, $WO_3$ and other impurities.

If desired, the leach residue could be treated by caustic fusion or other means to separate and recover the Ta, Nb, $WO_3$ and remainder of the Sn.

The $SnO_2$ resulting from hydrolysis at 110° C. was repulped and washed with water, dried, reduced with $H_2$ at 570° C. and the resulting metal cast in small bars. A sample analyzed spectographically showed the following:

| | |
|---|---|
| Ag | 0.001 |
| Al | 0.001 |
| As | <.01 |
| B | 0.001 |
| Ba | 0.001 |
| Be | 0.001 |
| Bi | 0.001 |
| Ca | <.005 |
| Cd | N.D. |
| Co | .005 |
| Cr | 0.001 |
| Cu | <.005 |
| Fe | .003 |
| Ge | N.D. |
| Hg | N.D. |
| Li | N.D. |
| Mg | 0.001 |
| Mn | 0.001 |
| Mo | <.005 |
| Ni | 0.001 |
| Pb | .003 |
| Sb | N.D. |
| Si | .001 |
| Sn | M |
| Te | N.D. |
| Ti | 0.001 |
| V | <.005 |
| Zn | <.005 |
| Zr | <.005 |

N.D.=not detected.

It will be understood, of course, that modifications can be made in the preferred embodiment of the present invention as described hereinabove without departing from the scope and purview of the appended claims.

What we claim as new and desire to protect by Letters Patent of the United States is:

1. The method for treating impure tin metal to separate undesirable impurities therefrom which comprises leaching the impure tin at a temperature below 30° C. in an aqueous sulphuric acid solution under an overpressure of oxygen to produce a solution containing dissolved tin sulphate; separating the resulting solution from undissolved residue and hydrolyzing the tin sulphate by heating said solution to a temperature above about 50° C. under an oxygen overpressure to precipitate an oxidized tin compound from said solution; and separating said compound from the leach solution.

2. The method for treating impure tin metal to separate undesirable impurities therefrom which comprises leaching the impure tin under an oxygen overpressure above about 5 p.s.i. at a temperature below 30° C. in an aqueous sulphuric acid solution containing at least 3.0 moles of acid per mole of tin; continuing the leaching with agitation to extract tin and produce a leach containing dissolved tin (IV) sulphate and tin (II) sulphate; separating the resulting leach solution from the undissolved residue and heating said solution to a temperature in the range of about 50° C. to about 110° C. under an oxygen overpressure to hydrolyze said Sn (IV) sulphate and Sn (II) sulphate and precipitate an oxidized tin compound from solution substantially free from impurities; and separating the tin precipitate from the solution.

3. The method according to claim 2 in which at least ⅓ of the sulphate anion requirements normally provided by the sulphuric acid are provided by the addition of a soluble sulphate salt.

4. The method for treating impure tin metal to separate undesirable impurities therefrom which comprises leaching the impure tin in finely divided form under an oxygen overpressure above about 5 p.s.i. at a temperature in the range of about 10° C. to about 30° C. in an aqueous sulphuric acid solution containing at least 3.0 moles of acid per mole of tin; continuing the leaching with agitation to extract substantially all soluble tin and produce a leach solution containing dissolved tin (IV) sulphate and tin (II) sulphate; separating the resulting leach solution from the undissolved residue and heating said solution to a temperature in the range of about 90° C. to about 110° C. under an oxygen overpressure above about 5 p.s.i. to hydrolyze said Sn (II) sulphate and Sn (IV) sulphate and form tin dioxide; continuing said heating step to precipitate substantially all the tin from solution as tin dioxide substantially free from impurities; separating said tin dioxide from the solution and recovering high purity tin in elemental form therefrom.

5. The method according to claim 4 in which high purity tin is recovered by reduction of the tin dioxide to tin metal with hydrogen at a temperature above about 570° C.

6. The method according to claim 4 in which the impure tin subjected to treatment is in the form of finely divided particles less than about 150 microns in size.

7. The method according to claim 2 in which the solution separated from the tin dioxide precipitate is recycled to the leaching step.

8. A process for recovering high purity tin from cassiterite containing lead and other undesirable metal and non-metal impurities which comprises the steps of: reducing the cassiterite with hydrogen at a temperature above about 570° C. to produce impure metallic tin; leaching the impure tin under a positive partial pressure of oxygen at a temperature below 30° C. in an aqueous sulphuric acid solution containing at least 3.0 moles of acid per mole of tin; continuing the leaching with agitation to extract tin and dissolve it in the leach solution as Sn (IV) sulphate and Sn (II) sulphate; separating the leach solution from undissolved residue and heating said solution to between about 90° C. and 110° C. under an overpressure of oxygen above about 10 p.s.i. to hydrolyze tin sulphate and regenerate sulphuric acid whereby high purity tin dioxide precipitates and undesirable impurities remain in the leach solution; separating substantially pure tin dioxide from said solution and recovering tin of at least 99.9% purity therefrom.

9. The process according to claim 8 in which the barren leach solution containing regenerated sulphuric acid is re-cycled to the impure tin leaching step.

References Cited by the Examiner

UNITED STATES PATENTS

| | | | |
|---|---|---|---|
| 981,451 | 1/1911 | McKechnie et al. | 75—101 |
| 2,726,929 | 12/1955 | Richter | 75—115 |
| 3,241,950 | 3/1966 | Mackiw et al. | 75—115 |
| 3,241,951 | 3/1966 | Forward et al. | 75—115 |

DAVID L. RECK, *Primary Examiner.*

N. F. MARKVA, *Assistant Examiner.*